US012448286B1

(12) United States Patent
Hadj Ahmed et al.

(10) Patent No.: US 12,448,286 B1
(45) Date of Patent: Oct. 21, 2025

(54) SYSTEM AND METHOD FOR PRODUCING HYDROGEN GAS BY USING MICROWAVE RADIATION

(71) Applicant: KING SAUD UNIVERSITY, Riyadh (SA)

(72) Inventors: Ahmed Yacine Badjah Hadj Ahmed, Riyadh (SA); Rakan Tariq AlFayez, Riyadh (SA); Zeid Abdullah AlOthman, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/736,093

(22) Filed: Jun. 6, 2024

(51) Int. Cl.
*C01B 3/00* (2006.01)
*B01J 8/00* (2006.01)
(Continued)

(52) U.S. Cl.
CPC .............. *C01B 3/042* (2013.01); *B01J 8/008* (2013.01); *B01J 21/04* (2013.01); *B01J 35/40* (2024.01);
(Continued)

(58) Field of Classification Search
CPC ............ C01B 3/042; C01B 2203/0277; C01B 2203/0855; C01B 2203/1041; C01B 2203/068; C01B 3/26; C01B 3/025; C01B 32/162; C01B 3/08; B01J 35/40; B01J 8/008; B01J 21/04; B01J 2208/00442; B01J 2219/0879; B01J 2219/0877; B01J 19/126; B01J 8/0285; B01J 8/1836; B01J 37/18; B01J 35/19; B01J 8/0278; B01J 2208/025; B01J 8/42; B01J 23/94; B01J 23/8946; B01J 23/58; B01J 38/12; B01J 23/96; B01J 23/75; B01J 8/1827; B01D 3/10;
(Continued)

(56) References Cited

U.S. PATENT DOCUMENTS

| | | | |
|---|---|---|---|
| 2008/0128411 A1* | 6/2008 | Martinez | C01B 3/08 204/157.52 |
| 2019/0232190 A1* | 8/2019 | Rivas | A61K 36/185 |

OTHER PUBLICATIONS

Chehade et al ("Hydrogen production by microwave based plasma dissociation of water", Fuel 264 (2020) 116831) (Year: 2020).*
(Continued)

*Primary Examiner* — Xiuyu Tai
(74) *Attorney, Agent, or Firm* — Nath, Goldberg & Meyer; Joshua B. Goldberg

(57) ABSTRACT

A system for producing hydrogen gas includes a first container, a microwave emitter configured to direct a microwave to the first container, a steam condenser, a second container and an effluent conduit. The first container includes a first container body configured to hold a quantity of water and aluminum particles inside. The steam condenser connects the first container with a first end of the effluent conduit. A second end of the effluent conduit can be inserted in the second container. The microwave emitter can be operated to direct a microwave to the water and aluminum particles (when the water aluminum particles are present inside of the first container). The radiation of the water and aluminum particles with the microwave will cause hydrogen gas to dissociate from the water. The hydrogen gas will travel through the steam condenser and the effluent conduit to be stored in the second container.

16 Claims, 4 Drawing Sheets

(51) Int. Cl.
  *B01J 21/04* (2006.01)
  *B01J 35/40* (2024.01)
  *C01B 3/04* (2006.01)
(52) U.S. Cl.
  CPC .............. *B01J 2208/00442* (2013.01); *C01B 2203/0277* (2013.01); *C01B 2203/0855* (2013.01); *C01B 2203/1041* (2013.01)
(58) Field of Classification Search
  CPC ...... B01D 3/40; B01D 11/0288; B01D 3/009; B01D 11/0284; B01D 1/225; B01D 11/0203; B01D 17/0214; C01C 1/0417; C01C 1/0494; C01C 1/0411; C11B 9/00; Y02E 60/36; A61K 36/185; Y02P 20/52; H05B 6/806
  See application file for complete search history.

(56) References Cited

OTHER PUBLICATIONS

Tang et al ("A comparison study on aluminum-water reaction with different catalysis", Materials Today Communications, 31(2022) 103517) (Year: 2022).*

Elitzur, et al. "Study of hydrogen production and storage based on aluminum—water reaction." International Journal of Hydrogen Energy 39.12 (2014): 6328-6334.

Yavor, et al. "Enhanced hydrogen generation from aluminum—water reactions." International journal of hydrogen energy 38.35 (2013): 14992-15002.

Chehade, et al. "Hydrogen production by microwave based plasma dissociation of water." Fuel 264 (2020): 116831.

Serra, et al. "Hydrogen production via microwave-induced water splitting at low temperature." Nature Energy 5.11 (2020): 910-919.

Godart, et al. "Hydrogen production from aluminum-water reactions subject to varied pressures and temperatures." International Journal of Hydrogen Energy 44.23 (2019): 11448-11458.

Rosenband, et al. "Application of activated aluminum powder for generation of hydrogen from water." International Journal of Hydrogen Energy 35.20 (2010): 10898-10904.

Bolt, et al. "A review of unique aluminum-water based hydrogen production options." Energy & Fuels 35.2 (2021): 1024-1040.

Jung, et al. "Hydrogen generation from the dissociation of water using microwave plasmas." Chinese Physics Letters 30.6 (2013): 065204.

* cited by examiner

SYSTEM AND METHOD FOR PRODUCING HYDROGEN GAS BY USING MICROWAVE RADIATION

TECHNICAL FIELD

The present disclosure relates to hydrogen gas, and more particularly, to a system and method for producing for hydrogen gas by using microwave radiation.

DISCUSSION OF THE RELATED ART

Given the energy crisis in the world and the undesirable phenomenon of greenhouse gas emissions that results from the combustion of fossil fuels, research and development of alternative clean energy sources are of high priority for humanity in general and the Kingdom of Saudi Arabia in particular. Hydrogen gas is considered a clean energy source from among numerous promising sources of green energy. This is because the combustion of hydrogen releases a large amount of energy without producing toxic or dangerous combustion byproducts.

Water can be a source for producing hydrogen gas. In fact, several conventional methods are known for producing hydrogen gas from water. However, these methods require the utilization of highly specialized equipment. This equipment is costly to acquire and requires highly skilled technicians to operate it.

SUMMARY

The present disclosure relates to a system and method for producing hydrogen gas from water. The system of the present disclosure can be assembled for a low cost. Users can be quickly trained to assemble the system of the present disclosure and to operate it safely and effectively.

The system and method of the present disclosure includes filling a container at least partially with water. A certain quantity of aluminum particles can be added to the water. A microwave emitter (for example, a magnetron) can be used to direct microwave(s) to the container with water and aluminum particles.

The magnetron will cause the water to be heated and to undergo a chemical reaction by which hydrogen gas (and oxygen gas) are dissociated from the water as effluent gasses (e.g., due to the water splitting phenomenon). The aluminum particles act as a catalyst, increasing the rate of the dissociation reaction without undergoing any permanent chemical change themselves.

A steam condenser may be connected to the opening of the container to condense the steam rising from the water surface and to return the condensate back into the container. The produced effluent gas, including hydrogen gas and oxygen gas, travels through the steam condenser while the condensed water returns back to the container via gravity. An outlet of the steam condenser is connected to a conduit (e.g., an effluent conduit). The conduit transmits the effluent gas to a collection container. This way, the produced hydrogen gas (together with the effluent oxygen gas) can be stored in the collection container.

A hydrogen detector can be connected to the conduit to measure the content of hydrogen gas in the effluent gas. An oxygen detector can also be connected to the conduit to measure the content of oxygen gas in the effluent gas.

The system of the present disclosure can be operated to produce effluent gas having a high concentration of hydrogen. Specifically, the system of the present disclosure can be used to produce effluent gas comprising from about 60% to about 70% hydrogen gas by volume.

A conventional microwave oven can be used to irradiate the water with aluminum particles therein. For example, the container used for holding the water with aluminum particles can be a beaker. A though hole can be created in the top sidewall of the microwave oven. The body of the beaker (which contains the water with aluminum particles) can be inserted in the irradiation chamber of the microwave oven with the neck of the beaker extending outside of the microwave oven via the through hole in the top sidewall thereof. This way, the opening of the beaker can be located outside of the microwave oven.

The opening of the beaker can be connected to the steam condenser such that, when the microwave oven is operated with the body of the beaker inserted in the irradiation chamber, the steam and effluent gas produced by the water in the beaker can be transferred to the steam condenser. The conduit can be connected to the steam condenser and to the collection container to enable the effluent hydrogen gas to be accumulated in the collection container.

This configuration enables the system of the present disclosure to have a low construction cost and to be operated in environments that lack advanced laboratory equipment and/or highly trained personnel while producing a considerable amount of hydrogen gas at a low production cost.

BRIEF DESCRIPTION OF THE DRAWINGS

The above and other features of the present disclosure will become more apparent by describing in detail exemplary embodiments thereof in conjunction with the accompanying drawings, in which.

DETAILED DESCRIPTION OF THE EMBODIMENTS

Figure 1:
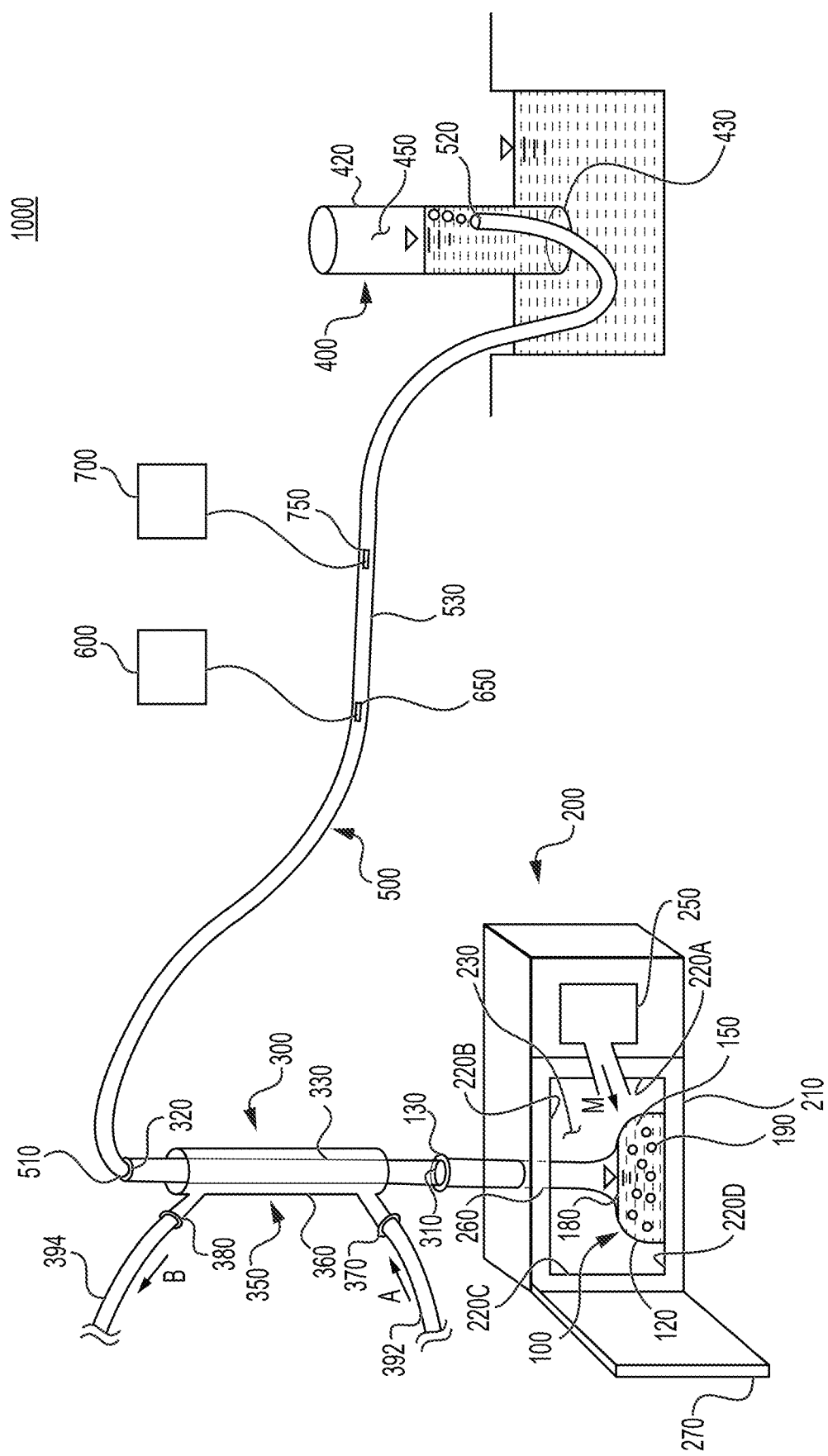
FIG. 1 is a diagram illustrating a system for producing gas effluent according to the present disclosure.
Figure 2A:
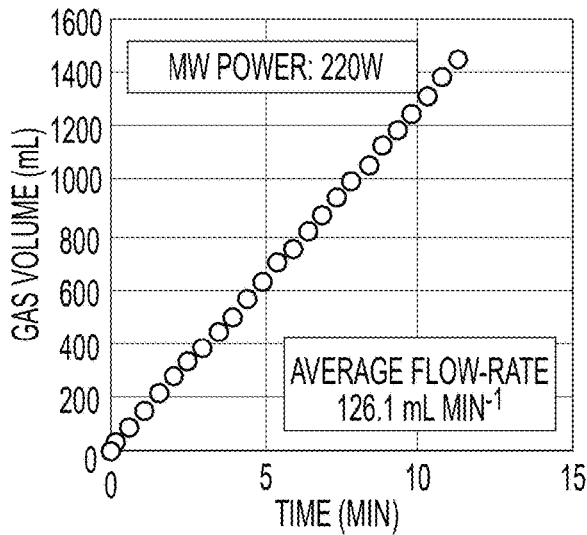
FIG. 2A is a graph illustrating the gas effluent produced by using the system of FIG. 1 over time according to a first operational setting.
Figure 2B:
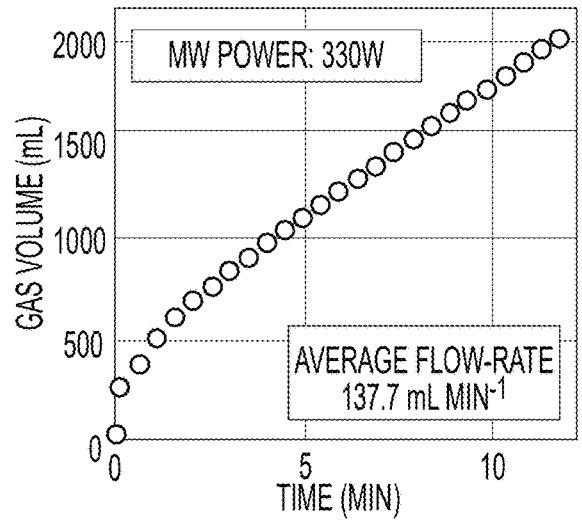
FIG. 2B is a graph illustrating the gas effluent produced by using the system of FIG. 1 over time according to a second operational setting.
Figure 2C:
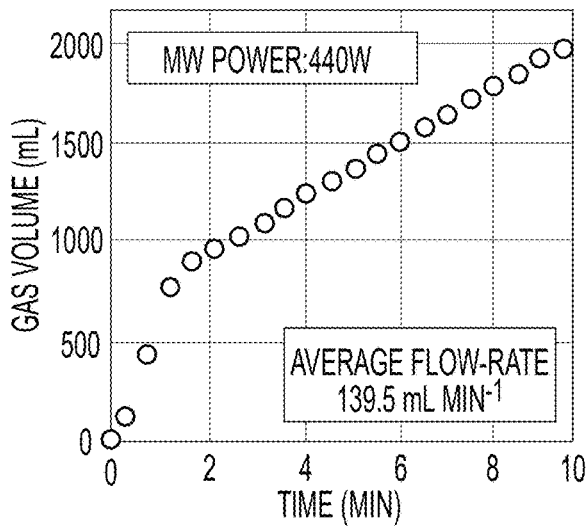
FIG. 2C is a graph illustrating the gas effluent produced by using the system of FIG. 1 over time according to a third operational setting.
Figure 2D:
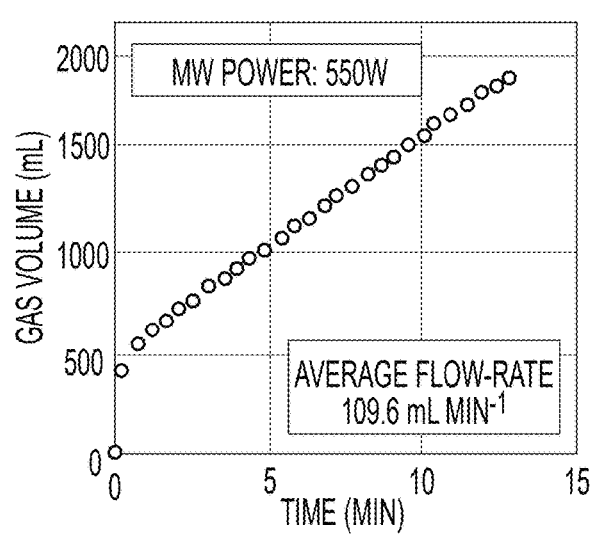
FIG. 2D is a graph illustrating the gas effluent produced by using the system of FIG. 1 over time according to a fourth operational setting.
Figure 2E:
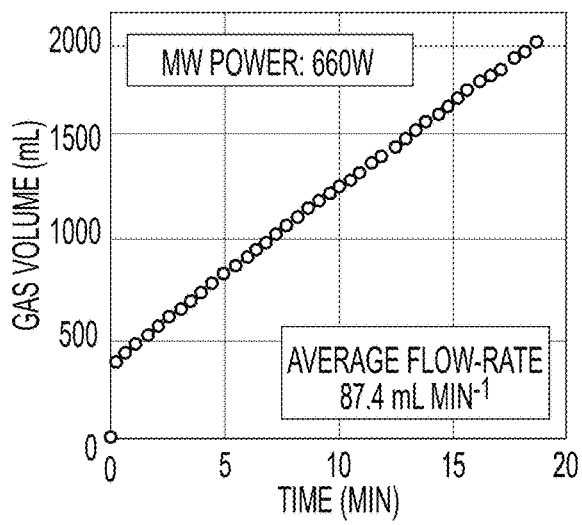
FIG. 2E is a graph illustrating the gas effluent produced by using the system of FIG. 1 over time according to a fifth operational setting.
Figure 2F:
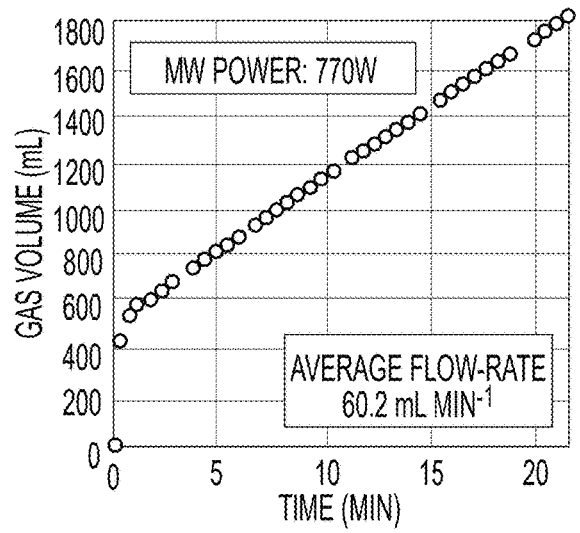
FIG. 2F is a graph illustrating the gas effluent produced by using the system of FIG. 1 over time according to a sixth operational setting.
Figure 2G:
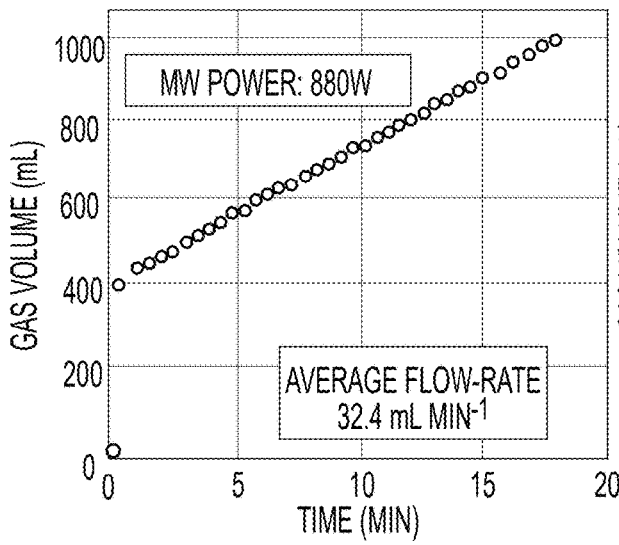
FIG. 2G is a graph illustrating the gas effluent produced by using the system of FIG. 1 over time according to a seventh operational setting.
Figure 2H:
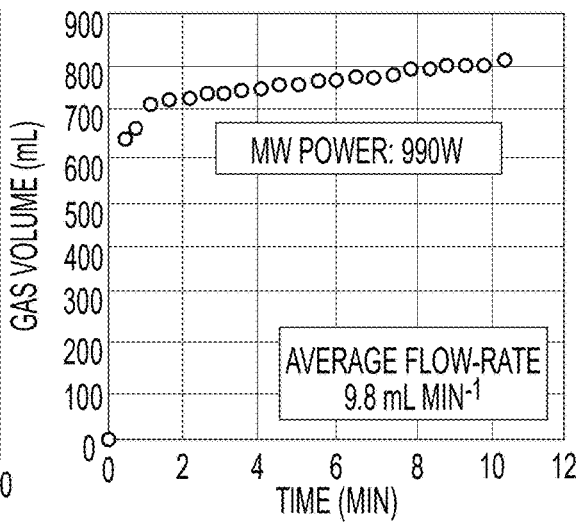
FIG. 2H is a graph illustrating the gas effluent produced by using the system of FIG. 1 over time according to an eighth operational setting.

Exemplary embodiments of the present disclosure will be described more fully hereinafter with reference to the accompanying drawings. The present disclosure may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" may include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

With reference to FIG. 1, a system 1000 for generating hydrogen gas effluent, according to the present disclosure, includes a first container 100 and a microwave device 200 configured to direct a microwave (or a band of microwaves) toward the first container 100. The microwave or band thereof are indicated by arrow "M" in FIG. 1. The system 1000 of the present disclosure may also include a steam condenser 300 in fluid communication with the first container 100, a second container 400, an effluent conduit 500 fluidly connecting the steam condenser 300 and the second container 400 to one another, a hydrogen detector 600 connected to the effluent conduit 500 and an oxygen detector 700 connected to the effluent conduit 500.

As illustrated in FIG. 1, the microwave device 200 may be a microwave oven that includes a housing 210 and a microwave emitter 250 (e.g., a magnetron) connected to the housing. The housing 210 of the microwave device 200 includes a plurality of sidewalls 200A-220D that, together with a rear wall of the microwave device 200 and the front door 270 of the microwave device 200, define an irradiation chamber 230 in the microwave device 200.

Sidewall 220B (e.g., a top sidewall of the irradiation chamber 230) may include a through opening 260. The magnetron 250 is configured to direct a microwave (or a plurality of microwaves) to the irradiation chamber 230. The microwave and/or plurality of microwaves may have a frequency ranging from about 300 MHz to about 300 GHz.

The microwave device 200 (which may be alternatively referred to as a "microwave oven" in this specification) may be a conventional microwave oven readily available for purchase from a multitude of microwave oven manufacturers. For example, the microwave oven illustrated in FIG. 1 and used in the first to third examples described below is a conventional microwave oven manufactured by the Kenwood Corporation of Japan, having model number/name _____.

The microwave oven 200 is illustrated as having its front door 270 open in FIG. 1 for clarity purposes, that is, to illustrate the structural configuration and content of the first container 100 in the irradiation chamber 230. The front door 270 of the microwave oven 200 should be closed when using the magnetron 250 to irradiate the content of the first container 100.

The first container 100 includes a first container body 120 having a first opening 130. The first container body 120 defines a first interior storage area 150 (of the first container 100), accessible through the first opening 130.

The first container body 120 includes a material configured to enable microwave radiation to pass therethrough. For example, the first container 100 body may be made of glass, a polymeric material, ceramic material, or other suitable material. Non-limiting examples of polymeric material may include plexiglass, polycarbonate, polyvinyl chloride, etc. Non-limiting examples of ceramic material may include porcelain, baked clay, etc. In a particular non-limiting example, the first container 100 is a glass beaker.

The first interior storage area 150 is configured to hold a quantity of liquid 180 inside. The liquid 180 may be water by itself or water in combination with other substances. For brevity purposes, the liquid 180 may be referred to as "water" in this specification.

As illustrated in FIG. 1, the first interior storage area 150 can be filled at least partially with water. The water can be, for example, distilled water or tap water.

Tap water is water that has not been purified, distilled, or otherwise treated. For example, tap water may include water obtained from a faucet or tap, water obtained from a lake, stream or pond, water obtained from underground (e.g., well water), etc. In an approach, rainwater may also be considered to be tap water by virtue of not being purified, distilled or otherwise treated by a human-controlled process prior to being used.

As illustrated in FIG. 1, a quantity of aluminum particles 190 may be included in the water. The aluminum particles 190 act as a catalyst in the dissociation reaction that occurs when the water inside of the first interior storage area 150 is irradiated by a microwave (or a band of microwaves). The dissociation reaction results in the production of hydrogen gas (dissociated from the water) and oxygen gas (also dissociated from the water).

A ratio of the aluminum particles 190 to the water may range from about 1:5 g/mL to about 1:25 g/mL.

A size (for example, length) of the aluminum particles 190 may range, for example, from about 1 mm to about 10 mm.

The aluminum particles 190 may result, for example, by obtaining a sheet of aluminum material (e.g., an aluminum sheet being longer than 10 mm) and cutting the obtained aluminum sheet into a plurality of smaller components (or pieces). The aluminum components/pieces 190 that result from the cutting step may have a size as described in this specification (e.g., from about 1 mm to about 10 mm).

Alternatively, or in addition, the aluminum particles 190 may result from obtaining aluminum material in sizes larger than about 10 mm in length (e.g., obtaining aluminum bars, aluminum rods, or more broadly, aluminum pieces of material having a size greater than about 10 mm) and grinding the obtained aluminum pieces to produce aluminum particles 190 having a size in the range of about 1 mm to about 10 mm.

While the aluminum particles 190 are described as having a size ranging from about 1 mm to about 10 mm above, the present disclosure is not limited to aluminum particles of this size range. For example, aluminum particles 190 having a size (e.g., length) smaller than 1 mm and/or aluminum particles 190 having a size greater than about 10 mm are also effective in acting as a catalyst in the water dissociation reaction, and can be inserted in the water in the first interior storage area 150 together with aluminum particles in the size range of about 1 mm to about 10 mm, or in lieu of the aluminum particles in the size range of about 1 mm to about 10 mm.

Aluminum particles 190 of a size ranging from about 1 mm to about 10 mm may be easy to handle by a user of the system 1000 of the present disclosure. For example, a user of the system 1000 can easily store aluminum particles 190 having a size ranging from about 1 mm to about 10 mm in length (in an aluminum storage container), easily weigh the aluminum particles 190, easily pour them inside of the first interior storage area 150 of the first container 100, and easily remove them from the first interior storage area 150 of first container 100 (after having used the aluminum particles 190 as a catalyst to generate hydrogen gas) for reuse.

However, and as described above aluminum particles 190 of a size smaller than about 1 mm and/or aluminum particles 190 of a size greater than about 10 mm can be used instead of or in conjunction with aluminum particles 190 in the size range of about 1 mm to about 10 mm as a catalyst in the method of the present disclosure.

The steam condenser 300 may include a first end 310 in fluid communication with the first opening 130 of the first container 100 (e.g., the first end 310 of the steam condenser 300 may have an airtight connection with the first opening 130), a second end 320 opposite to the first end 310, and an elongated steam condenser body 330 extending between the first and second ends 310, 320. The steam condenser body 330 may include a material having good thermal conductivity in order to efficiently condense steam inside (e.g., the steam generated when the water inside of the first interior storage area 150 is heated when irradiated with microwave(s) from the magnetron 250).

For example, the steam condenser body 330 may include a metal or a metal alloy (e.g., a metal/alloy that has a high resistivity to oxidation and good thermal conductivity). The metal may include, for example, steel (e.g., stainless steel), copper, nickel, tin, chromium, zinc, etc., or alloys thereof. This configuration increases the thermal exchange between the steam inside of the steam condenser body 330 and the environment outside of the first condenser body, which is cooler than the steam. This configuration, in turn, increases the condensation rate inside of the steam condenser body 330.

Alternatively, or in addition, the steam condenser body 330 may include glass and/or a polymeric material.

In addition, the steam condenser 300 may include a cooling chamber 350 in thermal communication with the steam condenser body 330. The cooling chamber 350 may include the same material(s) as the steam condenser body 330 or different material(s).

The cooling chamber 350 may have a cooling chamber body 360 in thermal communication with the steam condenser body 330, a cooling chamber inlet 370 in fluid communication with the cooling chamber body 360 and a cooling chamber outlet 380 in fluid communication with the cooling chamber body 360.

A first cooling conduit 392 may be in fluid communication with the cooling chamber inlet 370, and a second cooling conduit 394 may be in fluid communication with the cooling chamber outlet 380.

A cooling fluid, for example, water, a gas, etc., or a combination thereof may be caused to flow into the cooling chamber body 360 through the first cooling conduit 392 (see inflow directional arrow A) and the cooling chamber inlet 370. The cooling fluid, having entered the cooling chamber body 360, may be caused to flow out of the cooling chamber body 360 via the cooling chamber outlet 380 and the second cooling conduit 394 (see outflow directional arrow B).

The cooling fluid may have a temperature of less than about 100° C. to effectively assist in condensing the steam inside of the steam condenser body 330.

As illustrated in FIG. 1, the steam condenser 300 may be located at a higher elevation than the elevation of the water surface in the first interior storage area 150 of the first container body 120. This configuration enables the condensed water droplets forming on an interior wall of the steam condenser body 330 to flow back into the first interior storage area 150 of first container body 120 via gravity.

This arrangement (with the steam condenser 300 being disposed above the surface of the water in the first interior storage area 150) ensures that little to no water is lost from the first interior storage area 150 as steam, thereby, maximizing the amount of water that is available for splitting in the first container body 120. In turn, this configuration maximizes the quantity (or volume) of hydrogen gas effluent that can be produced in a single run, or stated otherwise, maximizes the amount of hydrogen gas effluent that can be produced without refilling the first container body 120 with water since virtually the entire amount of water that is lost as steam returns to the first interior storage area 150 as a condensate. Moreover, the arrangement between the first container 100 and the steam condenser 300 as described in this specification minimizes steam from being transferred to the second container 400 together with the effluent hydrogen and oxygen gasses produced by the dissociation reaction of water in the first interior storage area 150.

All of the components of the system 1000 of FIG. 1, with the exception of the first container 100, should be disposed outside of the microwave oven 200. However, a connection between the first opening 130 of the first container 100 and the first end 310 of the steam condenser 300 may be made inside of the irradiation chamber 230, or outside of the irradiation chamber 230. Stated otherwise, the first container 100 may be long enough to have the first container body 120 extend through the through opening 260 in the top sidewall of the microwave oven 200 such that the connection between the first opening 130 and the first end 310 of the steam condenser 300 can be made outside of the irradiation chamber 230.

Alternatively, the first container 100 may be short/small enough to fit entirely within the irradiation chamber 230. In this case, the connection between the first opening 130 and the first end 310 of the steam condenser 300 can be made inside of the irradiation chamber 230.

As indicated above, the second container 400 may be used to collect (or store) the effluent hydrogen gas and the effluent oxygen gas that result from the dissociation reaction of water. The second container 400 may also be referred to as a "collection container" in this specification. The second container 400 may be made of the same material(s) as the first container 100 or of different material(s). The effluent hydrogen and oxygen gasses are illustrated as bubbles being released inside of the liquid in the second container 400 for clarity purposes.

The second container 400 may include a second container body 420 having a second opening 430, the second container body 420 defining a second interior storage area 450 (of the second container 400), accessible through the second opening 430.

The effluent conduit 500 includes a first conduit end 510 in fluid communication with the second end 320 of the steam condenser 300 (e.g., the first conduit end 510 may have an airtight connection with the second end 320 of the steam condenser 300), a second conduit end 520 opposite to the first conduit end 510, and an effluent conduit body 530 extending between the first and second conduit ends 510, 520.

The second conduit 520 end is in fluid communication with the second interior storage area 450 such that the hydrogen gas emitted from the liquid inside of the first interior storage area 150 of the first container 100 can be transmitted to the second interior storage area 450 of the second container 400 through the effluent conduit 500.

In a non-limiting approach, as illustrated in FIG. 1, the second container 400 may be oriented to have the second opening 430 arranged at its bottom, and the second interior storage area 450 can be filled with a fluid (e.g., water) prior to beginning to collect hydrogen and oxygen effluent gasses produced when the magnetron 250 of the microwave oven 200 is operated. In this case, the second conduit end 520 may be inserted in the second interior storage area 450 through the second opening 430 of the second container 400 such that the effluent hydrogen gas (and the effluent oxygen gas), produced by the dissociation reaction of water in the first interior storage area 150, can be transmitted from the effluent conduit 500 into the second interior storage area 450.

Since the hydrogen (and oxygen) gas flowing into the second interior storage area 450 is less dense than the liquid inside of the second interior storage area 450, the hydrogen and oxygen gasses rise upwardly into the second interior storage area 450, displacing the liquid out of the second interior storage area 450.

This configuration enables a user of the system 1000 of the present disclosure to observe the collection of effluent gas (hydrogen and oxygen gas) in the second container 400. The second container body 420 may be graduated when made of a transparent material (e.g., when the second container 400 is a glass beaker) in order to enable a user to quickly determine the volume of effluent gas collected in the second interior storage area 450.

In addition, the configuration of the second container 400 above enables a user to quickly determine when the second container 400 is filled near its maximum storage capacity in order to replace the filled second container 400 with an empty container.

However, the present disclosure is not limited to the configuration of the second container 400 as illustrated in FIG. 1. For example, in another non-limiting approach, the second container 400 might not be filled with a liquid prior to being used to capture the generated effluent gas from the first container 100.

As illustrated in FIG. 1, the hydrogen detector 600 may be used to determine a content of hydrogen gas in the effluent gas produced by the dissociation reaction of water (the effluent gas flows through the effluent conduit 500 toward the second container 400). For example, the hydrogen detector 600 may include a thermal conductivity detector (TCD) cell (or sensor) 650 inserted in the effluent conduit body 530 to detect the volume content percentage of hydrogen gas in the effluent gas flowing through the effluent conduit body 530. The hydrogen detector 600 is configured to receive data from the hydrogen detector sensor 650 (e.g., the TCD cell) to detect a content of hydrogen gas in the elongated effluent conduit body 530.

The hydrogen detector 600 may be, for example, device model number (or model name) _____, manufactured by the Chang Ai Company of China.

The utilization of the system 1000 of FIG. 1 can produce an effluent gas stream containing about 60% to about 70% hydrogen gas by volume. The about 60% to about 70% range is considered to be high, and is believed to not have been previously achieved.

The hydrogen detector 600 was calibrated prior to each use (or hydrogen production run) to accurately detect the volume percentage of hydrogen gas in the effluent gas stream flowing in the effluent conduit 500. The calibration process included flushing the TCD cell 650 with a pure nitrogen gas stream (to calibrate the 0% hydrogen volume reading) followed by flushing the TCD cell 650 with a pure hydrogen gas stream (to calibrate the 100% hydrogen volume reading).

Therefore, the about 60% to about 70% measurement of hydrogen gas volume readings in the effluent gas produced by using the system 1000 as described in this specification is accurate.

The oxygen detector 700 may be used to measure the oxygen content in the effluent gas as a volume percentage of the effluent gas. The oxygen detector 700 may include an oxygen sensor 750 inserted in the effluent conduit body 530 to detect the volume content percentage of oxygen gas in the effluent gas flowing through the effluent conduit body 530. The oxygen detector 700 is configured to receive data from the oxygen sensor 750 to detect a content of oxygen gas in the elongated effluent conduit body 530.

In the system 1000 of FIG. 1, the oxygen detector 700 was used to determine that the initial oxygen content in the effluent conduit body was consistently in the range of about 20%-21% by volume (i.e., prior to powering the magnetron 250) due to the presence of ambient air in the effluent conduit body 540. Then, when the magnetron 250 was powered to radiate the water with aluminum particles 190 in the first container body 120, the level of oxygen in the effluent conduit body 530 increased progressively to about 30%-40% by volume. This result confirms that microwave irradiation induces the dissociation reaction of water in the first interior storage area 150 of the first container body 120, effectively producing a mixture of gaseous hydrogen and oxygen.

The following examples set forth data obtained by using the system 1000 of FIG. 1 to produce effluent hydrogen gas.

Example 1

In example 1, 1 g of finely cut pieces of aluminum was placed in the first interior storage area 150 of the first container 100 (e.g., a 500 mL round bottom flask). The term "finely cut" means pieces of aluminum having a size ranging from about 1 mm in length to about 10 mm in length. 10 mL of distilled water was added to the first interior storage area 150. The Kenwood microwave oven (hereinafter referred to as "Kenwood device 200" for brevity) described in this specification was operated to radiate the water with aluminum particles 190 by using the available radiation power levels of 2 to 9. Radiation power levels of 2 to 9 of the Kenwood device 200 respectively correspond to power consumption values ranging from 220 W to 990 W. In other words, a new mixture of 1 g aluminum particles 190 and 10 ml distilled water was irradiated eight separate times, (in eight corresponding hydrogen effluent gas production runs), each time with a different power level value from among power level values 2 to 9.

FIGS. 2A-2H, respectively, illustrate the total effluent gas volume produced (as a function of time) by using the Kenwood device 200 at radiation power levels 2 to 9.

The second container 400 used to collect the effluent gas in the eight production runs of example 1 was a graduated beaker initially filled with water (e.g., filled entirely with water). This configuration facilitated the reading of the effluent gas collected inside of the beaker during each one of the eight production runs.

Referring to FIGS. 2A-2H, all eight production runs revealed a rapid production of effluent gas during the first minute, then a constant increase of the total volume in the remaining time. However, for the higher power level values, the initial production of effluent gas was high (e.g., a large amount of effluent gas was produced over a short period of time), followed by a low rate of production thereafter (or a slow increase in the total volume of effluent gas produced).

Most of the eight production runs of example 1 were stopped when the second container became full with a total effluent gas volume of 2,000 mL, while the run time (or irradiation time) for each of the eight production runs ranged from 9.42 minutes to 21.30 minutes.

Figure 3:
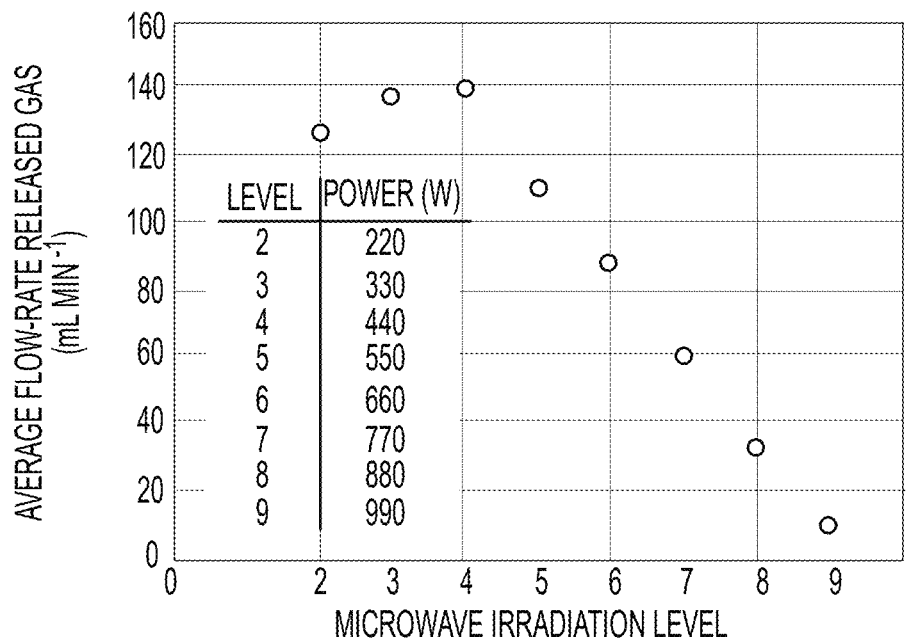
FIG. 3 is a graph illustrating an average flow rate of the gas effluent produced by using the system of FIG. 1 in the first to eighth operational settings.

The average flow rate (of effluent gas production rate) for each of the eight production runs of example 1 was calculated, with the result ranging from about 9.8 mL/min to about 139.5 mL/min, as illustrated in FIG. 3. The highest average flow rate was 139.5 mL/min. This flow rate was reached when using power level 4 (or 440 W).

Example 2

Example 2 illustrates the ability of the microwave-powered hydrogen generator system 1000 of FIG. 1 to be operated over an extended period of time (e.g., over 30 minutes). In example 2, 4 g of aluminum particles 190 and 20 mL of tap water were inserted in the first interior storage area 150 of the first container. The Kenwood device 200 was operated at power level value 3 (or 330 W).

Figure 4:
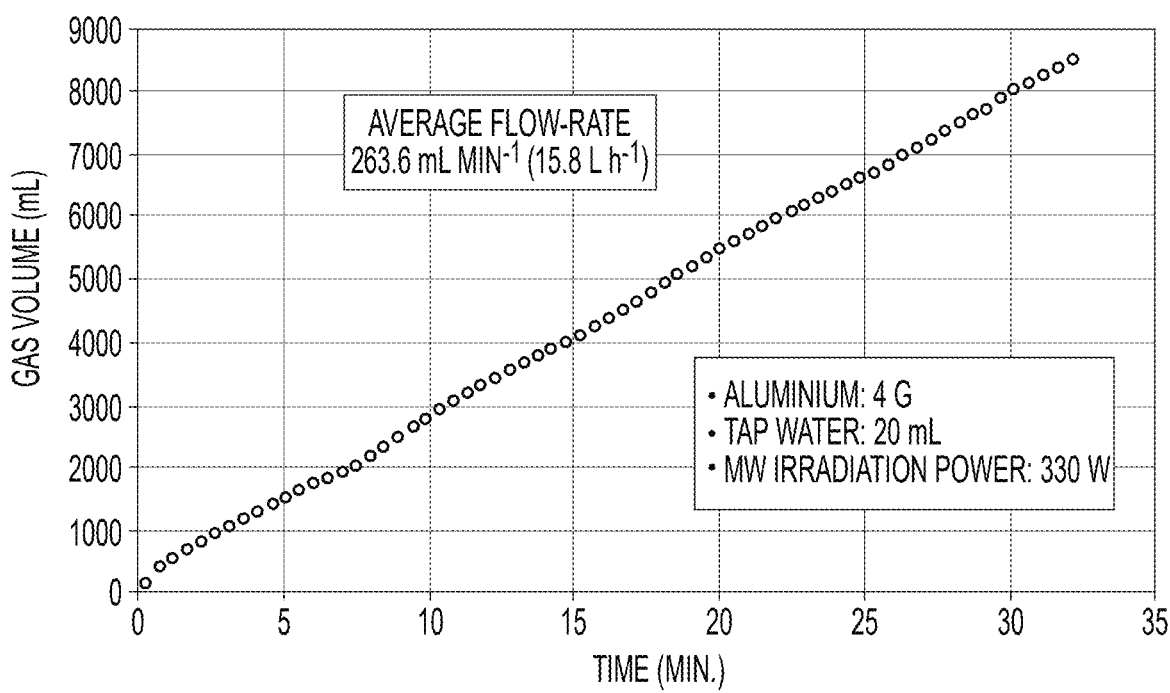
FIG. 4 is a graph illustrating the gas effluent produced by using the system of FIG. 1 according to a ninth operational setting.

FIG. 4 illustrates the volume of effluent gas produced when operating the Kenwood device 200 as indicated above for example 2 (with a beaker containing 4 g aluminum particles 190 and 20 mL tap water) at power level value 3 for over 30 minutes.

As illustrated in FIG. 4, a continuous effluent gas production was observed at virtually the same rate for more than 30 min, and 8,530 mL of effluent gas was produced (including hydrogen gas and oxygen gas).

As illustrated in FIG. 4, the effluent gas production remained virtually constant during the run time, and the average effluent gas flow rate was 263.6 mL/min.

Example 3

Example 3 included inserting 1 g of aluminum particles 190 and 10 mL of tap water in the first interior storage area 150 of the first container. The Kenwood device 200 was operated at power level value for 112 minutes, producing over 13,000 mL of effluent gas (including hydrogen gas and oxygen gas). The 1 g of aluminum particles 190 were carefully observed at the end of the production run of example 3. The 1 g of aluminum particles 190 appeared to be unchanged, i.e., usable again to produce hydrogen gas effluent as described in this specification without any significant difference in performance. This result confirms that the aluminum particles 190 are a catalyst in the water splitting reaction (e.g., the dissociation reaction) induced by the microwave radiation.

When using glass parts in the system 1000 of FIG. 1, the glass parts may be connected to one another by using glass quickfit joints.

Based on the disclosure of this specification, a method of producing hydrogen gas includes inserting a quantity of water in a container (e.g., the first container 100), irradiating the water in the container with a microwave for a period of time to produce a gas effluent, and collecting the gas effluent (e.g., in the second container 400). The water inserted in the container (or first container 100) is as described in this specification.

Aluminum particles 190 can be added to the water prior to the radiation step. A ratio of the aluminum particles 190 to the water ranges from about 1:5 g/mL to about 1:25 g/mL. The aluminum particles 190 may have a size as described in this specification.

When starting with large aluminum components (e.g., aluminum particles that do not fit into the first container), the method of the present disclosure may include grinding the aluminum components to reduce their size. The grinding step enables the ground aluminum particles (e.g., the particles 190) to fit in the first container 100, to have a large surface area in contact with the water relative to their weight, etc. A large surface area to weight ratio of the aluminum particles 190 may yield a high catalytic effect during the dissociation reaction of water.

In addition, as described in this specification, the aluminum particles 190 can also be obtained by sourcing a sheet of aluminum material (e.g., aluminum foil) and cutting the sheet into smaller pieces of aluminum material, the resulting smaller cut pieces of aluminum material (e.g., the particles 190) being inserted in the container (or first container 100).

As described in this specification, the produced steam may be cooled upstream of a point where the produced effluent gas is collected by using the steam condenser 300 (with or without the cooling chamber 350).

While the present disclosure has been particularly shown and described with reference to exemplary embodiments thereof, it will be apparent to those of ordinary skill in the art that various changes in form and detail may be made therein without departing from the spirit and scope of the present disclosure as defined by the following claims.

What is claimed is:

1. A system configured to produce hydrogen gas, the system comprising:
   a first container, the first container including a first container body having a first opening, the first container body defining a first interior storage area accessible through the first opening, the first container body including a material configured to enable microwave radiation to pass therethrough, wherein the first container body holds a quantity of liquid inside, wherein the liquid comprises water;
   a quantity of aluminum particles received within the quantity of liquid in the first interior storage area of the first container body, wherein the aluminum particles have a size ranging from about 1 mm to about 10 mm;
   a microwave emitter configured to direct a microwave to the first interior storage area;
   a steam condenser having a first end in fluid communication with the first opening of the first container body, a second end opposite to the first end thereof, and an elongated steam condenser body extending between the first and second ends thereof; and
   an effluent conduit having a first conduit end in fluid communication with the second end of the steam condenser, a second conduit end opposite to the first conduit end, and an elongated effluent conduit body extending between the first and second conduit ends,
   wherein, when the first interior storage area of the first container contains the quantity of liquid inside, the microwave emitter is configured to direct the microwave to the first interior storage area such that the microwave can travel through the first container body and through the liquid inside of the first interior storage area to cause the hydrogen gas to be emitted from the liquid, the quantity of aluminum particles being a catalyst for a microwave dissociation reaction of the water, and
   wherein the steam condenser is positioned above a surface of the water inside of the first interior storage area.

2. The system of claim 1, wherein a ratio of the aluminum particles to the water ranges from about 1:5 g/mL to about 1:25 g/mL.

3. The system of claim 1, further comprising a second container, the second container including a second container body having a second opening, the second container body defining a second interior storage area accessible through the second opening,
   wherein the second conduit end is in fluid communication with the second interior storage area such that the hydrogen gas emitted from the liquid can be transmitted to the second interior storage area.

4. The system of claim 1, wherein the steam condenser further includes a cooling chamber, wherein the cooling chamber includes a cooling chamber body in thermal communication with the steam condenser body, a cooling chamber inlet in fluid communication with the cooling chamber body and a cooling chamber outlet in fluid communication with the cooling chamber body,
   wherein the cooling chamber inlet is configured to enable a cooling fluid to flow into the cooling chamber body, and the cooling chamber outlet is configured to enable the cooling fluid, having entered the cooling chamber body, to flow out of the cooling chamber body.

5. The system of claim 1, further comprising a hydrogen detector, wherein the hydrogen detector includes a hydrogen detector sensor inserted in the elongated effluent conduit body,
   wherein the hydrogen detector is configured to receive data from the hydrogen detector sensor to detect a content of the hydrogen gas in the elongated effluent conduit body.

6. A method for producing hydrogen gas, the method comprising:
   inserting a quantity of water in a container, wherein the container includes a container body having an opening, the container body defining an interior storage area accessible through the opening, the container body including a material configured to enable microwave radiation to pass therethrough;
   inserting a quantity of aluminum particles within the water in the container body, wherein the aluminum particles have a size ranging from about 1 mm to about 10 mm;
   irradiating the water in the container with a microwave for a period of time to produce a gas effluent, the gas effluent including hydrogen gas, wherein the microwave is generated by a microwave emitter, the microwave emitter being configured to direct the microwave to the interior storage area of the container body, the quantity of aluminum particles being a catalyst for a microwave dissociation reaction of the water;
   condensing steam from the water with a steam condenser, the steam condenser having a first end in fluid communication with the opening of the container body, a second end opposite to the first end thereof, and an elongated steam condenser body extending between the first and second ends thereof, wherein an effluent conduit has a first conduit end in fluid communication with the second end of the steam condenser, a second conduit end opposite to the first conduit end, and an elongated effluent conduit body extending between the first and second conduit ends; and
   collecting the produced gas effluent,
   wherein the steam condenser is positioned above a surface of the water inside of the interior storage area.

7. The method of claim 6, wherein the container is made of a material selected from the group consisting of glass and a polymeric material.

8. The method of claim 6, wherein a ratio of the aluminum particles to the water ranges from about 1:5 g/mL to about 1:25 g/mL.

9. The method of claim 6, further comprising obtaining a sheet of aluminum material and cutting the obtained sheet of aluminum material into a plurality of aluminum sheet components, the plurality of aluminum sheet components comprising the aluminum particles.

10. The method of claim 6, further comprising obtaining preliminary aluminum particles of a first size and grinding the preliminary aluminum particles of the first size to produce secondary aluminum particles of a second size, smaller than the first size,
wherein the secondary aluminum particles of the second size are the aluminum particles inserted within the water in the container body.

11. The method of claim 6, wherein the water is tap water, and a ratio of the aluminum particles to the tap water ranges from about 1:5 g/mL to about 1:25 g/mL.

12. The method of claim 6, wherein the irradiation of the water in the container with the microwave produces steam in addition to the gas effluent, the method further comprising cooling the produced steam upstream of a point where the produced effluent gas is collected using the steam condenser.

13. The method of claim 6, wherein the collecting of the produced hydrogen gas includes directing the produced hydrogen gas into a collection container, wherein the collection container is filled at least partially with a fluid.

14. The method of claim 6, wherein the hydrogen gas comprises from about 60% to about 70% of the effluent gas by volume.

15. The method of claim 6, wherein the effluent gas further includes oxygen gas, wherein the oxygen gas comprises from about 20% to about 40% of the effluent gas by volume.

16. A method for producing hydrogen gas, the method comprising:
inserting a quantity of water in a container, wherein the container includes a container body having an opening, the container body defining an interior storage area accessible through the opening, the container body including a material configured to enable microwave radiation to pass therethrough;
inserting a quantity of aluminum particles in the water in the container, wherein a ratio of the aluminum particles to the water ranges from about 1:5 g/mL to about 1:25 g/mL, and wherein the aluminum particles have a size ranging from about 1 mm to about 10 mm;
irradiating the water with the aluminum particles in the container with a microwave for a period of time to produce a gas effluent, the quantity of aluminum particles being a catalyst for a microwave dissociation reaction of the water,
wherein the gas effluent includes hydrogen gas,
wherein the hydrogen gas comprises from about 60% to about 70% of the effluent gas by volume and,
wherein the microwave is generated by a microwave emitter, the microwave emitter being configured to direct the microwave to the interior storage area of the container body;
condensing steam from the water with a steam condenser, the steam condenser having a first end in fluid communication with the opening of the container body, a second end opposite to the first end thereof, and an elongated steam condenser body extending between the first and second ends thereof, wherein an effluent conduit has a first conduit end in fluid communication with the second end of the steam condenser, a second conduit end opposite to the first conduit end, and an elongated effluent conduit body extending between the first and second conduit ends; and
collecting the produced gas effluent,
wherein the steam condenser is positioned above a surface of the water inside of the interior storage area.

* * * * *